(12) United States Patent
Tortelli et al.

(10) Patent No.: US 10,081,691 B2
(45) Date of Patent: *Sep. 25, 2018

(54) CROSSLINKABLE COMPOSITIONS BASED ON VINYLIDENE FLUORIDE-TRIFLUOROETHYLENE POLYMERS

(71) Applicant: SOLVAY SPECIALTY POLYMERS ITALY S.P.A., Bollate (IT)

(72) Inventors: Vito Tortelli, Milan (IT); Alessio Marrani, Lecco (IT); Ivan Wlassics, Garessio (IT); Ivan Falco, Sedriano (IT)

(73) Assignee: SOLVAY SPECIALTY POLYMERS ITALY S.P.A., Bollate (Milan) (IT)

( * ) Notice: Subject to any disclaimer, the term of this patent is extended or adjusted under 35 U.S.C. 154(b) by 0 days.

This patent is subject to a terminal disclaimer.

(21) Appl. No.: 14/365,482

(22) PCT Filed: Dec. 6, 2012

(86) PCT No.: PCT/EP2012/074632
§ 371 (c)(1),
(2) Date: Jun. 13, 2014

(87) PCT Pub. No.: WO2013/087501
PCT Pub. Date: Jun. 20, 2013

(65) Prior Publication Data
US 2014/0378621 A1    Dec. 25, 2014

(30) Foreign Application Priority Data
Dec. 16, 2011 (EP) ..................... 11194156

(51) Int. Cl.
C08L 27/16 (2006.01)
C08F 214/22 (2006.01)
C08K 5/28 (2006.01)
C08K 5/43 (2006.01)
C08J 5/18 (2006.01)

(52) U.S. Cl.
CPC ............. *C08F 214/22* (2013.01); *C08J 5/18* (2013.01); *C08K 5/28* (2013.01); *C08K 5/43* (2013.01); *C08J 2327/24* (2013.01)

(58) Field of Classification Search
CPC ... C08K 5/28; C08K 5/43; C08L 27/16; C08F 214/22
See application file for complete search history.

(56) References Cited

U.S. PATENT DOCUMENTS

| 4,281,092 A | 7/1981 | Breazeale |
| 5,447,993 A | 9/1995 | Logothetis |
| 5,789,489 A | 8/1998 | Coughlin et al. |
| 6,365,693 B1 | 4/2002 | Hung |
| 7,122,608 B1 | 10/2006 | Brinati et al. |
| 2005/0170277 A1 | 8/2005 | Zannoni et al. |
| 2007/0166838 A1 | 7/2007 | Marsman et al. |
| 2009/0292075 A1 | 11/2009 | Tamai et al. |
| 2010/0324222 A1 | 12/2010 | Hung et al. |
| 2010/0324234 A1 | 12/2010 | Hung et al. |
| 2015/0005456 A1* | 1/2015 | Marrani ................ C08F 214/18 525/376 |

FOREIGN PATENT DOCUMENTS

| GB | 1009771 A | 11/1965 |
| WO | 2005064705 A1 | 7/2005 |
| WO | 2010014274 A1 | 2/2010 |

OTHER PUBLICATIONS

Van Breemen A.J.J.M. et al., "Photocrosslinking of ferroelectric polymers and its application in three-dimensional memory arrays", Applied Physics Letters, 2011, vol. 98(18), p. 183302-183302-3.

Wlassics I. et al., "Perfluoro Allyl Sulfate (FAFS) : a versatile building block for new fluoroallylic compounds", Molecules, 2011, vol. 16, p. 6512-6540.

Karimi Zarchi M.A. et al., "A mild and clean synthesis of alkyl azides from alkyl halides mediated by pol(4-vinylpyridine)-supported sodium azide under non-aqueous conditions", Journal of Applied Polymer Science, 2011, vol. 121, p. 1916-1920—Wiley Periodicals Inc.

Ito M. et al., "A simple and convenient synthesis of alkyl azides under mild conditions", Synthesis, 1995, n°4, p. 376-378.

* cited by examiner

Primary Examiner — Mark S Kaucher

(57) ABSTRACT

The present invention relates to crosslinkable compositions comprising vinylidene fluoride (VDF)/trifluoroethylene (TrFE) polymers and a fluorine-containing crosslinking agent of formula (A) [agent (Cz)]: $\{N_3[S(O)_{g1}]_{s1}\}_{na}$—$(R_H)_{nh}$—$R_f$—$(R'_H)_{nh'}$—$\{[S(O)_{g2}]_{s2}N_3\}_{na'}$, formula (A) wherein each of g1 and g2, equal to or different from each other, is 1 or 2, each of s1 and s2, equal to or different from each other, is 0 or 1, each of na and na' is independently zero or an integer of 1 to 3, provided that the sum na+na' is at least 2, each of $R_H$ and $R'_H$, equal to or different from each other, is a $C_1$-$C_{12}$ hydrocarbon group free of fluorine atoms, nh and nh', equal or different from each other are independently 0 or 1, and $R_f$ is selected from the group consisting of i) a $C_3$-$C_{20}$ fluorocarbon group, possibly comprising one or more ethereal oxygen atoms, ii) an oligomer comprising copolymerized units of vinylidene fluoride and trifluoroethylene, to a process for the manufacture of said compositions, to a method for curing the same, and to the use of said copolymers in electrical and electronic devices.

20 Claims, No Drawings

CROSSLINKABLE COMPOSITIONS BASED ON VINYLIDENE FLUORIDE-TRIFLUOROETHYLENE POLYMERS

CROSS-REFERENCE TO RELATED APPLICATION

This application is a U.S. national stage entry under 35 U.S.C. § 371 of International Application No. PCT/EP2012/074632 filed Dec. 6, 2012, which claims priority to European application No. EP 11194156.3 filed on Dec. 16, 2011. The entire contents of these applications are explicitly incorporated herein by this reference.

TECHNICAL FIELD

The present invention relates to crosslinkable compositions comprising vinylidene fluoride (VDF)/trifluoroethylene (TrFE) polymers, to a process for the manufacture of said compositions, to a method for curing the same, and to the use of said copolymers in electrical and electronic devices.

BACKGROUND ART

Vinylidene fluoride (VDF) copolymers comprising recurring units derived from trifluoroethylene (TrFE) monomer have been used extensively in the electronics packaging market due to their ease of processing, chemical inertness and attractive ferroelectric, piezoelectric, pyroelectric and dielectric properties.

As is well known, the term piezoelectric means the ability of a material to exchange electrical for mechanical energy and vice versa and the electromechanical response is believed to be essentially associated with dimensional changes during deformation or pressure oscillation. The piezoelectric effect is reversible in that materials exhibiting the direct piezoelectric effect (the production of electricity when stress is applied) also exhibit the converse piezoelectric effect (the production of stress and/or strain when an electric field is applied).

Ferroelectricity is the property of a material whereby this latter exhibits a spontaneous electric polarization, the direction of which can be switched between equivalent states by the application of an external electric field.

Pyroelectricity is the ability of certain materials to generate an electrical potential upon heating or cooling. Actually, as a result of this change in temperature, positive and negative charges move to opposite ends through migration (i.e. the material becomes polarized) and hence an electrical potential is established.

It is generally understood that piezo-, pyro-, ferro-electricity in copolymers of VDF with TrFE is related to a particular crystalline habit, so called beta-phase, wherein hydrogen and fluorine atoms are arranged to give maximum dipole moment per unit cell.

Copolymers comprising recurring units derived from vinylidene fluoride and trifluoroethylene are typically provided as semicrystalline copolymers which can be shaped or formed into semicrystalline, essentially unoriented and unstretched, thermoplastic film or sheet or tubular-constructed product via well known processing methods such as extrusion, injection moulding, compression moulding and solvent casting.

Nevertheless, more recently, developments of thin film electronic devices and/or assemblies of ferroelectric polymer layers in three-dimensional arrays for increasing e.g. memory density have called for different processing techniques, requiring notably ability of the polymer to be patterned according to lithographic techniques and/or for layers there from to be stacked with annealing treatment on newly formed layer not affecting previously deposited layers.

Within this scenario, thus, cross-linking (elsewhere referred to as 'curing'), which is one of the most known techniques in polymer science to stabilize shape and fix structures, has been the technique of choice for accessing these needs.

Solutions have thus been proposed for conferring to VDF-TrFE copolymers cross-linking or curing ability. Among those solutions, use of azide-containing coupling agents, because of their ability of inserting into carbon-hydrogen bonds under thermal or UV treatment, and yet of their relative robustness, has been considered. So, VAN BREEMEN, A. J. J. M., et al. "Photocrosslinking of ferroelectric polymers and its application in three-dimensional memory arrays". *Appl. Phys. Lett.* 2011, vol. 98, p. 183302. and US 2007/166838 (PHILIPS ELECTRONICS NORTH AMERICA CORPORATION) discloses a photolithography process designed to provide access to three-dimensional memory arrays, said process involving the photocrosslinking of VDF-TrFE polymers using as cross-linking agent azide or azo-compounds, including notably 2,6-bis(4-azide-benzylidene)-4-methylcyclohexanone and other analogous compounds.

Similarly, WO 2005/064705 (KONINKLIJKE PHILIPS ELECTRONICS N. V.) Jul. 14, 2005 discloses patterning by means of photolithography of fluorinated ferroelectric polymer layers, such as those derived from VdF-TrFE (random) copolymers, by addition of a photosensitive cross-linker, such as, e.g., a bis-azide, to a fluorinated polymer spin-coat solution. Nevertheless this document is deprived of any specific description of suitable bis-azide derivatives.

Nevertheless, in these approaches, use is made of non-fluorinated bis-azides, whose dispersability in the curable polymer compound is rather difficult because of inherent incompatibility of the hydrogenated moieties within the fluoropolymer matrix, so that curable mixture with uneven distribution of crosslinking agent can typically obtained, unless using severe mixing conditions which might elsewhere cause premature reaction/decomposition of the azide reactive moieties. Further, curable compounds with uneven distribution of crosslinking agent might provide, by curing, materials with regions having different crosslinking densities, which, as a consequence, might also possess unequal piezo-, pyro-, ferro-electricity properties, due to different microstructure.

There is thus still a need in the art for VDF/TrFE polymer crosslinkable composition which can undergo crosslinking under thermal or UV exposure conditions, yielding a uniformly cured material possessing improved thermal stability and which still maintains outstanding piezoelectric, ferroelectric, pyroelectric and dielectric properties.

On the other side, the azide-containing curing agents are known in the art, in particular for effecting curing of fluoroelastomers.

Thus, US 2010324222 (DUPONT PERFORMANCE ELASTOMERS) Dec. 23, 2010 discloses curable fluoroelastomer compositions comprising a VdF- or TFE-based fluoroelastomer comprising cure site monomers having a cure site selected from nitrile and alkyne groups and a curing agent having formula $N_3(Y)_p-(CH_2)_n-R-(CH_2)_m-(Y)_p N_3$, wherein Y is SO, $SO_2$, $C_6H_4$, or CO, p is 0 or 1, n, m are independently 1 to 4, and R is selected from the group consisting of i) a $C_3$-$C_{10}$ fluoroalkylene group, ii) a $C_3$-$C_{10}$ fluoroalkoxylene group, iii) a substituted arylene group, iv) an oligomer comprising copolymerized units of vinylidene fluoride and perfluoro(methyl vinyl ether), v) an oligomer comprising copolymerized units of vinylidene fluoride and hexafluoropropylene, vi) an oligomer comprising copolymerized units of tetrafluoroethylene and perfluoro(methyl vinyl ether), and vii) an oligomer comprising copolymerized units of tetrafluoroethylene and a hydrocarbon olefin. Non limitative examples of such curing co-agents are notably $N_3$—$CH_2CH_2$—$(CF_2)_6$—$CH_2CH_2$—$N_3$, $N_3$—$CH_2CH_2$—$(CF_2)_4$—$CH_2CH_2$—$N_3$ and $N_3$—$CH_2CH_2$-poly(VdF-co-PMVE)—$CH_2CH_2$—$N_3$.

SUMMARY OF INVENTION

It is thus an object of the present invention a crosslinkable composition comprising:
- a semi-crystalline fluoropolymer [polymer (F)] comprising recurring units derived from vinylidene fluoride (VDF) and from 10% to 50% by moles [with respect to the total moles of recurring units of polymer (F)] of recurring units derived from trifluoroethylene (TrFE); and
- at least one fluorine-containing crosslinking agent of formula (A) [agent (Cz)]:

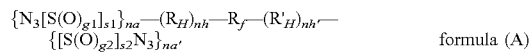

$\{N_3[S(O)_{g1}]_{s1}\}_{na}$—$(R_H)_{nh}$—$R_f$—$(R'_H)_{nh'}$—$\{[S(O)_{g2}]_{s2}N_3\}_{na'}$    formula (A)

wherein each of g1 and g2, equal to or different from each other, is 1 or 2, each of s1 and s2, equal to or different from each other, is 0 or 1, each of na and na' is independently zero or an integer of 1 to 3, provided that the sum na+na' is at least 2, each of $R_H$ and $R'_H$, equal to or different from each other, is a $C_1$-$C_{12}$ hydrocarbon group free of fluorine atoms, nh and nh', equal or different from each other are independently 0 or 1, and $R_f$ is selected from the group consisting of i) a $C_3$-$C_{20}$ fluorocarbon group, possibly comprising one or more ethereal oxygen atoms, ii) an oligomer comprising copolymerized units of vinylidene fluoride and trifluoroethylene.

The Applicant has surprisingly found that the fluorine-containing crosslinking agent as above detailed can be efficiently and easily dispersed and mixed with VDF-TrFE polymers, so as to provide very homogeneous curable compounds with no need of extreme or severe mixing conditions; such highly homogeneous compounds are easily cured by action of heat or UV radiation to provide cured structure with homogenous and strong bonding between polymer chains, while still maintaining outstanding piezoelectric, ferroelectric, pyroelectric and dielectric properties.

According to a first embodiment, the agent (Cz) complies with formula (B) herein below:

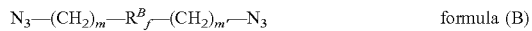

$N_3$—$(CH_2)_m$—$R^B_f$—$(CH_2)_{m'}$—$N_3$    formula (B)

wherein each of m and m' is independently an integer of 1 to 6, and $R^B_f$ is a $C_3$-$C_{10}$ fluorocarbon group, possibly comprising one or more ethereal oxygen atoms.

The agent (Cz) of this first embodiment complies preferably with formula (C) herein below:

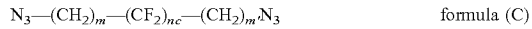

$N_3$—$(CH_2)_m$—$(CF_2)_{nc}$—$(CH_2)_{m'}$—$N_3$    formula (C)

wherein each of m and m' is independently an integer of 1 to 6, preferably m and m'=2, and nc is an integer of 4 to 10, preferably of 4 to 8.

Non limitative examples of agent (Cz) according to this variant are notably those of formula: $N_3$—$(CH_2)_2$—$(CF_2)_2$—$(CH_2)_2$—$N_3$, $N_3$—$(CH_2)_2$—$(CF_2)_4$—$(CH_2)_2$—$N_3$, $N_3$—$(CH_2)_2$—$(CF_2)_6$—$(CH_2)_2$—$N_3$, $N_3$—$(CH_2)_2$—$(CF_2)_8$—$(CH_2)_2$—$N_3$, $N_3$—$(CH_2)_2$—$(CF_2)_{10}$—$(CH_2)_2$—$N_3$.

Compounds of formula (C) can be manufactured by telomerisation of tetrafluoroethylene in the presence of iodine, followed by ethylene addition/incorporation onto C—I bonds, and subsequent nucleophilic displacement of iodine by an azide salt, preferably $NaN_3$.

According to a second embodiment, the agent (Cz) complies with formula (D) herein below:

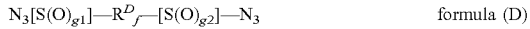

$N_3[S(O)_{g1}]$—$R^D_f$—$[S(O)_{g2}]$—$N_3$    formula (D)

wherein each of g1 and g2, equal to or different from each other, is 1 or 2, and $R^D_f$ is a $C_3$-$C_{20}$ fluoroalkyl group, possibly comprising one or more ethereal oxygen atoms.

Preferably, the agent (Cz) of this second embodiment complies with formula (E) herein below:

$N_3$—$SO_2$—$R^E_f$—$SO_2$—$N_3$    formula (E)

wherein $R^E_f$ is a $C_3$-$C_{20}$ fluoroalkyl group, possibly comprising one or more ethereal oxygen atoms.

Non limitative examples of agent (Cz) according to this variant are notably those of formula: $N_3SO_2$—$C_4F_8$—$SO_2N_3$, $N_3SO_2$—$(CF_2)_2$—O—$C_4F_8$—O—$(CF_2)_2$—$SO_2N_3$, $N_3SO_2$—$(CF_2)_2$—O—$CF(CF_3)CF_2$O—$C_4F_8$—O—$CF_2$—$CF(CF_3)$O—$(CF_2)_2$—$SO_2N_3$, $N_3SO_2$—$(CF_2)_2$—O—$CF_2CF(CF_3)$O—$C_4F_8$—O—$CF_2$—$CF(CF_3)$O—$(CF_2)_2$—$SO_2N_3$, $N_3SO_2$—$(CF_2)_2$—O—$CF_2CF(CF_3)$O—$C_4F_8$—O—$CF(CF_3)$—$CF_2$O—$(CF_2)_2$—$SO_2N_3$. Group of formula —O—$C_4F_8$—O— in each of the above can be any of —O—$(CF_2CF_2)_2$—O—, —O—$CF_2CF_2$—$CF(CF_3)$—O—, —O—$CF(CF_3)$—$CF(CF_3)$—O—.

Compounds of formula (E) can be manufactured by fluorine assisted dimerization of sulfonyl monomers, e.g. of formulae $CF_2$=$CF$—$SO_2F$, $CF_2$=$CF$—O—$CF_2CF_2SO_2F$, $CF_2$=$CF$—O—$CF(CF_3)CF_2OCF_2CF_2SO_2F$, $CF_2$=$CF$—O—$CF_2CF(CF_3)OCF_2CF_2SO_2F$, followed by nucleophilic displacement at the fluorosulfonyl group by reaction with an azide salt.

The polymer (F) of the invention comprises preferably from 15% to 48% by moles, more preferably from 16% to 45% by moles, even more preferably from 17% to 40% by moles of recurring units derived from trifluoroethylene (TrFE).

The polymer (F) of the invention may further comprise recurring units derived from one or more other fluorinated comonomers [comonomer (F)] different from VDF and TrFE and/or one or more non-fluorinated comonomers [comonomer (FI)].

The term "fluorinated comonomer [comonomer (F)]" is hereby intended to denote an ethylenically unsaturated comonomer comprising at least one fluorine atom.

The comonomer (F) may further comprise one or more other halogen atoms such as chlorine, bromine and iodine atoms.

While crosslinking of polymer (F) can be achieved, under certain conditions, through the use of agent (Cz) with polymers (F) which do not comprise cure-site monomers, with the aim of maximizing crosslinking ability, the polymer (F) of the invention will advantageously comprise recurring units derived from at least one cure-site monomer [monomer (CS)], this latter being an ethylenically unsaturated monomer comprising at least one reactive group selected from the group consisting of:
- an azide group [monomer (Az)],
- a nitrile group [monomer (CSM)];
- an alkyne group [monomer (CSA)].

The monomer (CS) can comprise at least one fluorine atom, so that it can qualify as comonomer (F) as above detailed.

Non-limitative examples of suitable comonomers (F) free from azide, nitrile and alkyne groups (that is to say different from monomer (CS)) notably include the followings:

(i) $C_2$-$C_8$ perfluoroolefins such as tetrafluoroethylene (TFE) and hexafluoropropylene (HFP);

(ii) perfluoroalkylethylenes of formula $CH_2=CH-R_{f0}$, wherein $R_{f0}$ is a $C_2$-$C_6$ perfluoroalkyl group;

(iii) chloro- and/or bromo- and/or iodo-$C_2$-$C_6$ fluoroolefins such as chlorotrifluoroethylene (CTFE);

(iv) perfluoroalkylvinylethers of formula $CF_2=CFOR_{f1}$, wherein $R_{f1}$ is a $C_1$-$C_6$ perfluoroalkyl group, such as perfluoromethylvinylether (PMVE) and perfluoropropylvinylether (PPVE);

(v) (per)fluorooxyalkylvinylethers of formula $CF_2=CFOX_0$, wherein $X_0$ is a $C_1$-$C_{12}$ oxyalkyl group or a $C_1$-$C_{12}$ (per)fluorooxyalkyl group having one or more ether groups, e.g. perfluoro-2-propoxy-propyl group;

(vi) (per)fluoroalkylvinylethers of formula $CF_2=CFOCF_2OR_{f2}$, wherein $R_{f2}$ is a $C_1$-$C_6$ (per)fluoroalkyl group, e.g. $-CF_3$, $-C_2F_5$, $-C_3F_7$, or a $C_1$-$C_6$ (per)fluorooxyalkyl group having one or more ether groups, e.g. $-C_2F_5-O-CF_3$;

(vii) functional (per)fluorooxyalkylvinylethers of formula $CF_2=CFOY_0$, wherein $Y_0$ is selected from a $C_1$-$C_{12}$ alkyl group or (per)fluoroalkyl group, a $C_1$-$C_{12}$ oxyalkyl group and a $C_1$-$C_{12}$ (per)fluorooxyalkyl group having one or more ether groups, $Y_0$ comprising a carboxylic or sulfonic acid group, in its acid, acid halide or salt form;

(viii) fluorodioxoles, especially perfluorodioxoles.

The comonomer (F) different from monomer (CS) is preferably free of hydrogen atoms.

Most preferred fluorinated comonomers (F) different from monomer (CS) are chlorotrifluoroethylene (CTFE), perfluoromethylvinylether (PMVE), tetrafluoroethylene (TFE), hexafluoropropylene (HFP).

Should the fluorinated comonomer (F) different from monomer (CS) be present, the polymer (F) of the invention comprises typically from 2% to 20% by moles, preferably from 3% to 18% by moles, more preferably from 4% to 15% by moles of recurring units derived from said fluorinated comonomer (F), with respect to the total moles of recurring units of polymer (F).

As said, according to certain embodiments, polymer (F) advantageously comprises recurring units derived from at least one cure-site monomer [monomer (CS)], this latter being an ethylenically unsaturated monomer comprising at least one reactive group selected from the group consisting of:

an azide group [monomer (Az)];
a nitrile group [monomer (CSM)]; and
an alkyne group [monomer (CSA)].

Monomer (CS) is generally a fluorine-containing monomer, that is to say it is generally a comonomer (F), as above described, comprising at least one reactive group selected from the group consisting of an azide group, a nitrile group, and an alkyne group.

It is generally preferred that from 0.01% to 15% by moles [with respect to the total moles of recurring units of polymer (F)] of recurring units derived from at least one monomer (CS), as above detailed.

The skilled in the art will select the appropriate concentration of recurring units derived from monomer (CS) in view of the crosslinking density required in the target field of use of polymer (F). It is nevertheless understood that appropriate crosslinking densities are advantageously obtained when the amount of recurring units derived from monomer (CS) is preferably of at least 0.05%, more preferably of at least 0.1%, with respect to the total moles of recurring units of polymer (F).

Aiming at not impairing piezo-, pyro-, ferro-electricity behaviour of polymer (F), it is also understood that the amount of recurring units derived from monomer (CS), when present, would be preferably of at most 15%, more preferably of at most 10%, with respect to the total moles of recurring units of polymer (F).

Among cure-site monomers of type (CSM), preferred monomers are those selected from the group consisting of:

(CSM-1) perfluorovinyl ethers containing cyanide groups of formula $CF_2=CF-(OCF_2CFX^{CN})_m-O-(CF_2)_n-CN$, with $X^{CN}$ being F or $CF_3$, m being 0, 1, 2, 3 or 4; n being an integer from 1 to 12;

(CSM-2) perfluorovinyl ethers containing cyanide groups of formula $CF_2=CF-(OCF_2CFX^{CN})_{m'}-O-CF_2-CF(CF_3)-CN$, with $X^{CN}$ being F or $CF_3$, m' being 0, 1, 2, 3 or 4.

Specific examples of cure-site containing monomers of type (CSM), including (CSM-1) and (CSM-2), suitable to the purposes of the present invention are notably those described in U.S. Pat. No. 4,281,092 (DU PONT) Jul. 28, 1981, U.S. Pat. No. 4,281,092 (DU PONT) Jul. 28, 1981, U.S. Pat. No. 5,447,993 (DU PONT) Sep. 5, 1995 and U.S. Pat. No. 5,789,489 (DU PONT) Aug. 4, 1998, US 2010324222 (DUPONT PERFORMANCE ELASTOMERS) Dec. 23, 2010.

Among cure-site monomers of type (GSA), preferred monomers are those selected from the group consisting of:

(CSA-1) (per)fluorovinyl ethers containing cyanide groups of formula $CF_2=CF-(OCF_2CFX^A)_m-O-(CF_2)_n-C\equiv CH$, with $X^A$ being F or $CF_3$, m being 0, 1, 2, 3 or 4; n being an integer from 1 to 12;

(CSA-2) fluorovinyl ethers containing cyanide groups of formula $CF_2=CF-(OCF_2CFX^A)_{m'}-O-(CF_2)_n-R^{HA}-C\equiv CH$, with $X^A$ being F or $CF_3$, m' being 0, 1, 2, 3 or 4, and $R^{HA}$ being a divalent hydrocarbon group free from fluorine atoms, possibly containing one or more ethereal or carbonyl oxygen(s).

Examples of cure site monomers that contain alkyne groups include, but are not limited to $CF_2=CFOCF_2CF(CF_3)OCF_2CF_2-C\equiv CH$; $CF_2=CFOCF_2CF(CF_3)OCF_2CF_2-COOCH_2C\equiv CH$; and $CF_2=CFOCF_2CF(CF_3)OCF_2CF_2-CH_2CH_2-O-CH_2-C\equiv CH$.

Specific examples of cure-site containing monomers of type (GSA), including (CSA-1) and (CSA-2), suitable to the purposes of the present invention are notably those described in US 2010324222 (DUPONT PERFORMANCE ELASTOMERS) Dec. 23, 2010.

Nevertheless, it is generally preferred that the monomer (CS) is indeed an ethylenically unsaturated monomer comprising at least one azide group, that is to say that monomer (CS) is a monomer (Az), as above detailed.

According to these preferred embodiments, polymer (F) generally comprises from 0.01% to 15% by moles, preferably from 0.1 to 10% by moles [with respect to the total moles of recurring units of polymer (F)] of recurring units derived from at least one monomer (Az).

Monomer (Az) is generally a fluorine-containing monomer, that is to say it is generally a comonomer (F), as above described, comprising an azide group [monomer (FAz)]. Monomer (FAz) generally complies with formula (I) herein below:

$$CX_1X_2=CX-(O)_p-R_f-(CH_2)_n-[S(O)_q]_s N_3 \qquad \text{formula (I)}$$

wherein: X, $X_1$ and $X_2$, equal to or different from each other, are independently H or F, p is 0 or 1, n is 0 to 4, s is 0 or 1, q is 1 or 2, $R_f$ is a divalent (hydro)fluorocarbon group, possibly interrupted by one or more ethereal oxygen atoms.

According to a first embodiment, p in formula 1 is 1, that is to say that monomer (FAz) is a vinyl ether monomer of formula (II):

$$CX_1X_2=CX-O-R_f-(CH_2)_n-[S(O)_q]_sN_3 \quad \text{formula (II)}$$

wherein: X, $X_1$ and $X_2$, equal to or different from each other, are independently H or F, n is 0 to 4, s is 0 or 1, q is 1 or 2, $R_f$ is a divalent (hydro)fluorocarbon group, possibly interrupted by one or more ethereal oxygen atoms.

According to a variant of this first embodiment, the azide group of formula (II) is a sulfonazide monomer with q=2 and s=1, that is to say that monomer (FAz) complies with formula (III):

$$CX'_1X'_2=CX'-O-R'_f-(CH_2)_{n'}-S(O)_2N_3 \quad \text{formula (III)}$$

wherein: X', $X'_1$ and $X'_2$, equal to or different from each other, are independently H or F, preferably F, n' is 0 to 4, preferably n'=0, and $R'_f$ is a perfluoroalkyl group, possibly comprising one or more ethereal oxygen atoms.

Preferred sulfonazide monomers of this embodiments are perfluorovinylethers derivatives of formulae: $CF_2=CF-O-CF_2-CF(CF_3)-O-CF_2CF_2-SO_2N_3$, $CF_2=CF-O-CF_2CF_2-SO_2N_3$, $CF_2=CF-O-CF_2CF_2CF_2-SO_2N_3$, $CF_2=CF-O-CF_2CF_2CF_2CF_2-SO_2N_3$.

These monomers can be manufactured from corresponding sulfonyl fluoride monomers by nucleophilic displacement of fluorine with an azide (typically $NaN_3$).

According to a second embodiment, p in formula (1) is 0, that is to say that monomer (FAz) is a monomer of formula (IV):

$$CX''_1X''_2=CX''-R''_f-(CH_2)_{n''}-[S(O)_{q''}]_{s''}N_3 \quad \text{formula (IV)}$$

wherein: X'', $X''_1$ and $X''_2$, equal to or different from each other, are independently H or F, n'' is 0 to 4, s'' is 0 or 1, q'' is 1 or 2, $R''_f$ is a divalent (hydro)fluorocarbon group, possibly interrupted by one or more ethereal oxygen atoms, wherein the $sp^2$ hybridized carbon atom of the terminal double bond =CX''— is bound to a $sp^3$ carbon atom of the $R''_f$ group.

According to a first variant of this second embodiment, the azide group of formula (IV) is a sulfonazide monomer with q=2 and s=1, that is to say that monomer (FAz) complies with formula (V):

$$CX''_1X''_2=CX''-R''_f-(CH_2)_{n''}-S(O)_2N_3 \quad \text{formula (V)},$$

wherein: X'', $X''_1$ and $X''_2$, equal to or different from each other, are independently H or F, n'' is 0 to 4, s'' is 0 or 1, q'' is 1 or 2, $R''_f$ is a divalent (hydro)fluorocarbon group, possibly interrupted by one or more ethereal oxygen atoms, wherein the $sp^2$ hybridized carbon atom of the terminal double bond =CX''— is bound to a $sp^3$ carbon atom of the $R''_f$ group.

According to certain embodiments of this first variant, n'' in formula (V) is zero, that is to say that monomer (FAz) advantageously complies with formula (VI):

$$CX''_1X''_2=CX''-R^*_f-SO_2N_3 \quad \text{formula (VI)},$$

wherein: X'', $X''_1$ and $X''_2$, equal to or different from each other, are independently H or F, $R^*_f$ is a divalent perfluoroalkyl group, possibly interrupted by one or more ethereal oxygen atoms, preferably of formula $-(CF_2)_{m''}-$, with m'' being an integer of 1 to 12, preferably 2, 4, 6, 8, 10, or 12, more preferably 4 or 6.

Non limitative examples of monomers (FAz) complying with formula (VI) here above are compounds of formula (VII):

$$CH_2=CH-(CF_2CF_2)_m-SO_2N_3 \quad \text{formula (VII)}$$

with m being an integer of 1 to 6, preferably 2 or 3.

Compounds of formula (VII) can be easily manufactured from corresponding di-iodo precursors of formula $I-(CF_2CF_2)_m-I$, by selective addition of ethylene on one chain end, selective dehydroiodination, and subsequent functionalization at the remainder chain end to provide the sulphonazide group.

According to other embodiments of this first variant, n'' in formula (V) is an integer different from zero, that is to say that monomer (FAz) advantageously complies with formula (VIII):

$$CX''_1X''_2=CX''-R^*_f-(CH_2)_{n^*}-SO_2N_3 \quad \text{formula (VIII)},$$

wherein: X'', $X''_1$ and $X''_2$, equal to or different from each other, are independently H or F, n* is an integer of 1 to 4, preferably 2 or 4, more preferably n* is 2; $R^*_f$ is a divalent perfluoroalkyl group, possibly interrupted by one or more ethereal oxygen atoms, preferably of formula $-(CF_2)_{m''}-$, with m'' being an integer of 1 to 12, preferably 2, 4, 6, 8, 10, or 12, more preferably 4 or 6.

Non limitative examples of monomers (FAz) complying with formula (VIII) here above are compounds of formula (IX):

$$CH_2=CH-(CF_2CF_2)_{m1}-(CH_2CH_2)_{n1}-SO_2N_3 \quad \text{formula (IX)}$$

with m1 being an integer of 1 to 6, preferably 2 or 3, and n1 being an integer of 1 to 3, preferably 1.

Compounds of formula (IX) can be easily manufactured from corresponding di-iodo precursors of formula $I-(CF_2CF_2)_m-I$, by insertion/addition of ethylene in iodine-carbon bonds, partial dehydroiodination and subsequent functionalization at the remainder $-CH_2CH_2-I$ chain end to provide the sulphonazide group.

According to further other embodiments of this first variant, the group $-R^*_f-$ in formula (V) is a group of formula $-CF_2-O-R^a_f-$, that is to say that the monomer (Az) complies with formula (X):

$$CX^a_1X^a_2=CX^a-CF_2-O-R^a_f-(CFH_2)_{na}-SO_2N_3 \quad \text{formula (X)},$$

wherein: X'', $X''_1$ and $X''_2$, equal to or different from each other, are independently H or F, preferably all are equal to F, na is 0 to 4, preferably na=0 and $-R^a_f-$ is a divalent perfluoroalkyl group having 1 to 6 carbon atoms, preferably $-CF_2CF_2-$.

Non limitative examples of monomers (FAz) complying with formula (X) here above are compounds of formula (XI):

$$CF_2=CF-CF_2O-CF_2CF_2-SO_2N_3 \quad \text{formula (XI)}.$$

Compounds of formula (IX) can be manufactured by reaction of fluoroallylflurosulfate with $FCO-CF_2-SO_2F$ to yield $CF_2=CF-CF_2O-CF_2-CF_2-SO_2F$ and subsequent nucleophilic substitution with an azide salt (typically $NaN_3$).

According to a second variant of this second embodiment, s in formula (IV) is zero, that is to say that monomer (FAz) complies with formula (XII):

$$CX''_1X''_2=CX''-R''_f-(CH_2)_{n''}-N_3 \quad \text{formula (XII)},$$

wherein: X", X"$_1$ and X"$_2$, equal to or different from each other, are independently H or F, n" is 0 to 4, s" is 0 or 1, q" is 1 or 2, R"$_f$ is a divalent (hydro)fluorocarbon group, possibly interrupted by one or more ethereal oxygen atoms, wherein the sp$^2$ hybridized carbon atom of the terminal double bond =CX"— is bound to a sp$^3$ carbon atom of the R"$_f$group.

According to certain embodiments of this first variant, n" in formula (XII) is zero, that is to say that monomer (FAz) advantageously complies with formula (XIII):

CX"$_1$X"$_2$=CX"—R*$_f$—N$_3$    formula (XIII), wherein: X", X"$_1$ and X"$_2$, equal to or different from each other, are independently H or F, R*$_f$ is a divalent perfluoroalkyl group, possibly interrupted by one or more ethereal oxygen atoms, preferably of formula —(CF$_2$)$_{m''}$—, with m" being an integer of 1 to 12, preferably 2, 4, 6, 8, 10, or 12, more preferably 4 or 6.

Non limitative examples of monomers (FAz) complying with formula (XIII) here above are compounds of formula (XIV):

CH$_2$=CH—(CF$_2$CF$_2$)$_m$—N$_3$    formula (XIV)

with m being an integer of 1 to 6, preferably 2 or 3.

Compounds of formula (XIV) can be easily manufactured from corresponding di-iodo precursors of formula I—(CF$_2$CF$_2$)$_m$—I, by selective addition of ethylene on one chain end, selective dehydroiodination, and subsequent nucleophilic substitution at the remainder chain end to provide the azide group.

According to other embodiments of this first variant, n" in formula (V) is an integer different from zero, that is to say that monomer (FAz) advantageously complies with formula (XV):

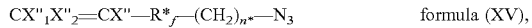

CX"$_1$X"$_2$=CX"—R*$_f$—(CH$_2$)$_{n*}$—N$_3$    formula (XV), wherein: X", X"$_1$ and X"$_2$, equal to or different from each other, are independently H or F, n* is an integer of 1 to 4, preferably 2 or 4, more preferably n* is 2; R*$_f$ is a divalent perfluoroalkyl group, possibly interrupted by one or more ethereal oxygen atoms, preferably of formula —(CF$_2$)$_m$—, with m" being an integer of 1 to 12, preferably 2, 4, 6, 8, 10, or 12, more preferably 4 or 6.

Non (imitative examples of monomers (FAz) complying with formula (XV) here above are compounds of formula (XVI):

CH$_2$=CH—(CF$_2$CF$_2$)$_{m1}$—(CH$_2$CH$_2$)$_{n1}$—N$_3$    formula (XVI)

with m1 being an integer of 1 to 6, preferably 2 or 3, and n1 being an integer of 1 to 3, preferably 1.

Compounds of formula (XVI) can be easily manufactured from corresponding di-iodo precursors of formula I—(CF$_2$CF$_2$)$_m$—I, by insertion/addition of ethylene in iodine-carbon bonds, partial dehydroiodination and subsequent nucleaphilic substitution at the remainder —CH$_2$CH$_2$—I chain end to provide the sulphonazide group.

As said, the polymer (F) of the invention is semi-crystalline, that is to say that it possesses a detectable melting point, when submitted to DSM measurements according to ASTM D3418.

As above explained, piezo-, pyro-, ferro-electricity behaviour in polymer (F) is understood to be related to certain crystalline habit (beta-phase): as a consequence, the presence of a certain degree of crystallinity is essential for providing the technical advantages of the present invention.

Advantageously, polymer (F) has a heat of fusion typically of from 10 to 90 J/g, preferably of from 30 to 60 J/g, more preferably of from 35 to 55 J/g as measured according to ASTM D3418.

The melt flow index (MFI) of the polymer (F) of the invention will be selected by the skilled in the art in relation to the processing technology chosen for obtaining final parts (e.g. films or sheets).

It is nevertheless generally understood that the polymer (F) will have a MFI as measured according to ASTM D1238 (230° C., 5 Kg) of advantageously at most 500 g/10 min, preferably of at most 200 g/10 min, more preferably of at most 50 g/10 min.

The polymer (F) backbone is typically interrupted by short chain branches terminated by end groups having formulae —CF$_2$H and/or —CF$_2$CH$_3$, which typically originate from intra-chain transfer (back-biting) during radical polymerization as shown in the scheme here below:

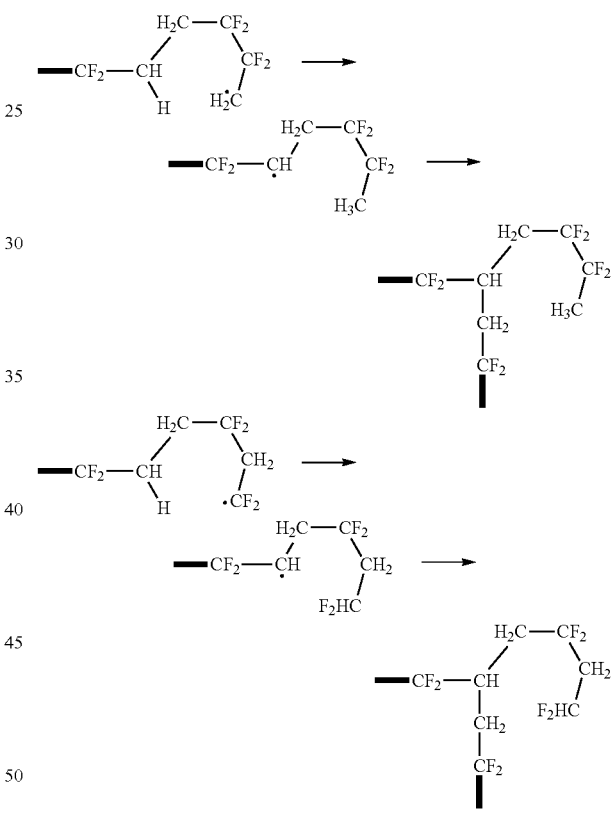

According to a first preferred embodiment of the invention, the polymer (F) comprises end groups of formula —CF$_2$H and/or —CF$_2$CH$_3$ in an amount of less than 30 mmoles per Kg of vinylidene fluoride (VDF) recurring units, preferably of less than 20 mmoles per Kg of VDF recurring units [polymer (F-1)].

The polymer (F-1) of this first preferred embodiment of the invention comprises preferably at least 0.02% by moles, more preferably at least 0.04% by moles of recurring units derived from at least one monomer (Az) as described above.

The polymer (F-1) of this first preferred embodiment of the invention comprises preferably at most 8% by moles, more preferably at most 5% by moles of recurring units derived from at least one monomer (Az) as described above.

According to a second preferred embodiment of the invention, the polymer (F) comprises end groups of formula —$CF_2H$ and/or —$CF_2CH_3$ in an amount of at least 30 mmoles per Kg of vinylidene fluoride (VDF) recurring units [polymer (F-2)].

Very good results have been obtained with polymers (F-2) according to this second preferred embodiment of the invention comprising end groups of formula —$CF_2H$ and/or —$CF_2CH_3$ in an amount of advantageously at least 40 mmoles per Kg of VDF recurring units, preferably of at least 50 mmoles per Kg of VDF recurring units.

The polymer (F-2) of this second preferred embodiment comprises preferably from 0.01% to 1% by moles, more preferably from 0.02% to 0.8% by moles, even more preferably from 0.04% to 0.6% by moles of recurring units derived from at least one monomer (Az) as described above.

The crosslinkable composition of this invention may also comprise additives, processing aids and fillers well known in the rubber and plastics industries such as, but not limited to, carbon black, mineral fillers including barium sulfate, talc and silica, fibrillating or non-fibrillating thermoplastic fluoropolymers, metal oxides, metal hydroxides and the like.

Another object of the present invention is a method for manufacturing the crosslinkable composition, as above detailed.

The method of the invention advantageously comprises mixing:
- a semi-crystalline fluoropolymer [polymer (F)] comprising recurring units derived from vinylidene fluoride (VDF) and from 10% to 50% by moles [with respect to the total moles of recurring units of polymer (F)] of recurring units derived from trifluoroethylene (TrFE); and
- at least one crosslinking agent of formula (A) [agent (Cz)]:

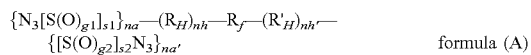

formula (A)

wherein each of g1 and g2, equal to or different from each other, is 1 or 2, each of s1 and s2, equal to or different from each other, is 0 or 1, each of na and na' is independently zero or an integer of 1 to 3, provided that the sum na+na' is at least 2, each of $R_H$ and $R'_H$, equal to or different from each other, is a $C_1$-$C_{12}$ hydrocarbon group free of fluorine atoms, nh and nh', equal or different from each other are independently 0 or 1, and $R_f$ is selected from the group consisting of i) a $C_3$-$C_{20}$ fluorocarbon group, possibly comprising one or more ethereal oxygen atoms, ii) an oligomer comprising copolymerized units of vinylidene fluoride and trifluoroethylene.

Still, a method of crosslinking the crosslinkable composition, as above detailed, for yielding a cured shaped part is another embodiment of the present invention.

Crosslinking of the composition of this invention may comprise exposing said composition to UV radiation and/or to heat.

Preferably, crosslinking comprises exposing the inventive composition to UV radiation.

The term UV radiation is intended to denote, to the purpose of the invention, electromagnetic radiation with a wavelength shorter than that of visible light, but longer than soft X-rays. It can be subdivided into near UV (380-200 nm wavelength; abbreviation: NUV), far or vacuum UV (200-10 nm; abbreviation: FUV or VUV), and extreme UV (1-31 nm; abbreviation: EUV or XUV). NUV having wavelength from 200 to 380 nm is preferred in the process of the invention. Either monochromatic or polychromatic radiation can be used.

UV radiation can be provided in the crosslinking process of the invention by any suitable UV radiation source. Preferred UV radiation source for the process of the invention is mercury lighting. It is known that a significant portion of the energy radiated from excited mercury vapours is in the ultra-violet part of the spectrum. In the case of the low pressure discharge, more than half of the total energy supplied is radiated in the short-wave UV region at 253.7 nm. High pressure lamps radiate about 10% of their energy in the long-wave UV region at 365.0 nm, but an appreciable amount is also radiated at shorter wavelengths.

The crosslinking process of the present invention can be used for manufacturing whichever kind of cured shaped articles. Parts of electrical and electronic devices are more preferably manufactured by such a process.

The cured articles can be notably sheets and films, including thin films and nano-layers and/or assemblies of the same.

The cured articles of the invention can be useful notably in different electronic devices including transducers, sensors, actuators, ferroelectric memories, capacitors powdered by electrical devices.

A further object of the present invention is a method for manufacturing one of electrical and electronic devices, comprising using a crosslinkable composition, as above detailed.

Such method generally comprises processing the composition of the invention and crosslinking the same.

Processing can be effected by any known techniques; nevertheless, solution processing techniques, including ink printing, casting, lithographic processes and the like would be preferred.

Crosslinking the composition can be performed as above specified.

The crosslinked composition of the invention is generally comprised in said devices under the form of bidimensional parts such as films (including thin films, and nano-layers) and sheets, or three-dimensional assemblies of the same.

The parts made of the crosslinked composition as above detailed are generally comprised as ferroelectric, piezoelectric, pyroelectric or dielectric materials in said electrical and electronic devices.

Should the disclosure of any patents, patent applications, and publications which are incorporated herein by reference conflict with the description of the present application to the extent that it may render a term unclear, the present description shall take precedence.

The invention will be now described in more detail with reference to the following examples whose purpose is merely illustrative and not limitative of the scope of the invention.

Differential Scanning Calorimetry (DSC) Analyses

DSC analyses were carried out according to ASTM D 3418 standard method. $T_{m2}$ represents the melting temperature as measured in the second heating cycle. $T_{xx}$ represents the crystallization temperature as measured during intermediate cooling cycle. $T_{Curie2}$ represents the Curie temperature as measured in the second heating cycle.

Determination of Breakdown Voltage

Breakdown voltage values were measured according to ASTM D149-97a standard method on specimens of dielectric fluoropolymer films of given thickness. The higher the breakdown voltage values, the higher the voltage at which current begins to flow through the insulating dielectric fluoropolymer film.

PREPARATIVE EXAMPLE 1—SYNTHESIS OF $CF_2$=$CFOCF_2CF_2SO_2N_3$ [MONOMER (Az1)]

According to a procedure similar to the procedures disclosed in U.S. Pat. No. 6,365,693 (DUPONT DOW ELASTOMERS LLC) Apr. 2, 2002 and modified, as below detailed, the above referenced compound was synthesized. In a three necks round bottomed glass flask 1.375 g=21.15 mmoles of $NaN_3$ were suspended in 13 ml of $CH_3CN$, which has been previously dried by distillation over $P_2O_5$ and storage onto 3A molecular sieves. The mixture was stirred at 500 rpm at 20° C. for about 20 minutes; 5.05 g=18.03 mmoles of $CF_2$=$CFOCF_2CF_2SO_2F$ (VEFS) were then added dropwise during 19 min. The molar concentration of VEFS ([$CF_2$=$CFOCF_2CF_2SO_2F$]) in the mixture was thus equal to 1.38 M. The exothermic reaction gave rise to a temperature increase of about 2° C. The reaction mixture, at the end of the addition was found to be milky and became translucent. The mixture was kept under stirring at 20° C. for 48 hours under inert $N_2$ atomsphere. The reaction was brought to completion by heating the mixture for 3 hours at 40° C. The mixture was then cooled at 20° C., and this temperature was then maintained for additional 3 hours. The raw reaction mixture appeared to be an opalescent solution with no visible precipitate. This mixture was poured in 70 ml of distilled water, from which a clear and transparent oil having a acre smelling immediately separated.

From quantitative $^{19}$F-NMR determinations, the so precipitated oil was found to correspond to target product. Aqueous phase were separated and found to contain NaF as reaction by-product.

Yield=57% with respect to the starting amount of VEFS.
Selectivity towards $^{a,b}CF_2$=$^cCFO^dCF_2^{\ e}CF_2SO_2N_3$=78% moles.

Remaining 22% moles was found to correspond to $N_3^{\ f}CF_2^{\ g}CFHO^hCF_2^{\ i}CF_2SO_2N_3$.

$^{19}$F-NMR; ($CDCl_3$; ppm): a:−110; b: −118; c: −133; d: −80,2; e: −110,4; f: −90; g: −142 ($J^1_{H,F}$=47 hz); h: −78---->−83; i: −110,4

FT-IR (KBr; $cm^{-1}$): 1839 ($CF_2$=$CFO$— st.); 2156 (—$N_3$ st.); 1421+1463 (—$SO_2$—$N_3$ st.); 1200-1100 (CF st.).

PREPARATIVE EXAMPLE 2—SYNTHESIS OF $CF_2$=$CFCF_2OCF_2CF_2SO_2N_3$ [MONOMER (Az2)]

The precursor $FSO_2CF_2CF_2OCF_2CF$=$CF_2$ was prepared according to methods described in the literature (WLASSICS, I., et al. Perfluoro Allyl Sulfate (FAFS): a Versatile Buildng Block For New Fluoroallylic Compounds. *Molecules*. 2011, vol.16, p. 6512_6540.).

Synthetic procedure described above for comparative azide compound (1) was modified so as to ensure minimizing contact between the allylether and the NaF (which is a by product of the reaction) and which could catalyze decomposition of vinyl ether precursor to perfluoropropylene and $FO_2S$—$CF_2$—$COF$.

In a glass cylindrical jacketed reactor, with three inlets, 15.15 mmoles=5.00 g of $FSO_2CF_2CF_2OCF_2CF$=$CF_2$ were introduced, in combination with 90 µl of a phase transfer agent commercially available as Aliquat ($CH_3$—N—[($CH_2$)$_7CH_3$]$_3^+Cl^-$), corresponding to 1% v/v. The solution so obtained was cooled at 15° C. using a cryostat connected to the reactor racket. Using an automatic dispensing syringe containing a solution made of 7.5 ml of distilled $H_2O$ and 2.395 g=36.85 mmoles of $NaN_3$, said solution was added dropwise at a rate of 0.1 eq. $NaN_3$/h; reactor temperature was kept at 15° C. during the whole addition time (about 24 hours). Temperature was then raised to 20° C. for further 8 hours. At the end of the reaction, the reaction mixture was composed of two phases. Upper phase, composed of $H_2O$, NaF and residual $NaN_3$ was discarded. Lower phase was recovered and centrifuged at 15° C. and 4000 rpm during 20 minutes so as to eliminate solid particulate residues. A colorless and clear oil was obtained having a characteristic acre smell.

Yield (after purification and separation)=65% moles.
Selectivity=55/45  NB-A=$^{a,b}CF_2$=$^cCF^dCF_2O^eCF_2^{\ f}CF_2SO_2N_3$; B=$N_3^{\ g}CF_2^{\ h}CFH^iCF_2O^jCF_2^{\ m}CF_2SO_2N_3$ $^{19}$F-NMR; ($CDCl_3$; ppm): a:−89; b: −102; c: −185.4; d: −72.3; e: −79.3 (AB); f: −109.3; g: −78->−82 (m); h: −206 ($J^1_{H,F}$=48 hz); i: −74.5;---->−83; l:−79.3 (AB); m: −109.3.

FT-IR (KBr; $cm^{-1}$): 1792 ($CF_2$=$CF$–$CF_2$ st.); 2163 (—$N_3$ st.); 1464+1384 (—$SO_2$—$N_3$ st.); 1200-1100 (CF st.).

PREPARATIVE EXAMPLE 3—SYNTHESIS OF $CH_2$=$CH(CF_2)_6CH_2CH_2N_3$ [MONOMER (Az3)]

A di-iodinated precursor was manufactured by tetrafluoroethylene ($C_2F_4$) telomerization with iodine ($I_2$) in the presence of diterbutylperoxide (DTBP), and isolating a $I(CF_2)_6I$ fraction.

Ethylene addition was then performer with ethylene at a temperature of 180° C. and under a $C_2H_4$ pressure of 50 atm, so as to obtain corresponding addition product of formula $ICH_2CH_2(CF_2)_6CH_2CH_2I$ with a selectivity of more than 98,5%. Less than 1.5% moles of the telomer gave rise to the oligomer $I(C_2H_4)_2(CF_2)_6CH_2CH_2I$.

The compound of formula $ICH_2CH_2(CF_2)_6CH_2CH_2I$ was submitted to partial dehydro-iodination with 0.5 molar equivalent of KOH in $C_2H_5OH$ at 75° C.; distillation of the raw reaction mixture enabled isolating $ICH_2CH_2(CF_2)_6CH$=$CH_2$ with a purity of about 95% by moles.

In a glass reactor equipped with a condenser cooled with water, magnetic stirring, thermometer and dropping funnel, were introduced 0.876 g (13.48 mmoles) of $NaN_3$, solubilized in 11 ml of distilled $H_2O$, and 341 µl of phase transfer catalyst Aliquat (1% on total volume), which remained as separated phase.

So formed dishomogeneous mixture was cooled at 3° C. using an ice bath. An homogeneous solution containing 5.0 g (10.37 mmoles) of $ICH_2CH_2(CF_2)_6CH$=$CH_2$ in 20 ml of $CH_2Cl_2$ was then added dropwise during 15 minutes. After 1 hour stirring (750 rpm) at 3° C., the reaction mixture was let to slowly revert to 25° C. during 60 minutes, and maintained at this temperature for additional 23 hours. Lower phase was then separated, and gel chromatography separation conditions were tested by TLC (developed in $I_2$ chamber), yielding two dots, a first dot ($R_f$=0) which was found to be the residual Aliquat, showing at $^1$H-NMR analysis typical aliphatic peaks between 1.5 and 0.5 ppm; and a second dot ($R_f$=0.42), which was found to be the target azide compound.

The $CH_2Cl_2$ solution was then chromatographied through a silica column having h=15 cm and diameter=1.5 cm, using n-hexane (4 times volume of the column) as eluent. The combined organic eluated fractions were dried over MgSO4 and then filtered. After removal of the solvent at 30° C. under vacuum (from 760 to 25 mm Hg), a pale yellow oil having an acre smell was obtained.

Isolated Yield=94.7% moles
Selectivity=100%
Density=1.730 g/ml.
$^aCH_2$=$^bCH^cCF_2^{\ d}CF_2^{\ e}CF_2^{\ f}CF_2^{\ g}CF_2^{\ h}CF_2^{\ i}CH_2^{\ j}CH_2N_3$ $^{19}$F-NMR; (CDCl$_3$; ppm): c:−112.2; d: −118.8; e: −120.6; f: −121; g: −119.4; g: −112.2.

$^1$H-NMR (CDCl$_3$; ppm): a: 6.0 (m); b: 5.8 (m).

FT-IR (KBr; cm$^{-1}$): 2955 (–CH$_2$-st); 2107 (–N$_3$ st.); 1654 (CH$_2$=CH— st.); 1255 (—C—N— st.); 1200-1140 (CF st.).

PREPARATIVE EXAMPLE 4—SYNTHESIS OF
N$_3$SO$_2$CF$_2$CF$_2$—O—C$_4$F$_8$—O—CF$_2$CF$_2$SO$_2$N$_3$
[AZIDE AGENT (Cz1)]

A disulfonylfluoride precursor was obtained by radical dimerization of CF$_2$=CFOCF$_2$CF$_2$SO$_2$F (VEFS) in the presence of F$_2$; molar composition as determined by $^{19}$F-NMR of the raw precursor was found to correspond to a 70/30 mol/mol mixture of FSO$_2$CF$_2$CF$_2$O(CF$_2$)$_4$OCF$_2$CF$_2$SO$_2$F over sum of (FSO$_2$CF$_2$CF$_2$OCF(CF$_3$))$_2$ FSO$_2$CF$_2$CF$_2$OCF(CF$_3$)CF$_2$CF$_2$OCF$_2$CF$_2$SO$_2$F.

In a glass round-bottomed flask, equipped with condenser cooled with water, magnetic stirring, thermometer and dropping funnel, 1.27 g (19.56 mmoles) of NaN$_3$ and 14 ml of CH$_3$OH were introduced. The opalescent mixture was then cooled at 3° C. with an ice bath; once cooled down at this set-point temperature, 5.00 g (8.36 mmoles=16.7 meq) of the above mentioned di-sulfonylfluoride isomers was added dropwise during about 17 minutes.

During this addition, exothermic reaction caused a temperature increase of about 10° C., with temperature rising from 3° C. to about 13° C. Once the temperature reverted back to 3° C., the mixture was maintained under stirring (750 rpm) at such temperature for 60 minutes. Then, the temperature was warmed to room temperature (20° C.) during 60 minutes and further maintained under stirring at such temperature for additional 15 hours. At the end of the reaction, the mixture was washed with 75 ml of distilled water. A colorless oil, slightly opalescent, immediately precipitated, which was filtered through a PTFE membrane (0.2 μm) to provide a perfectly clear and colorless oil.

Conversion of —SO$_2$F groups: 99% moles
Yield=60% moli
Selectivity=100%
Isomers molar ratio (linear/branched): 75.5/24.5
Density=1.68 g/ml
N$_3$SO$_2$$^a$CF$_2$$^b$CF$_2$O$^b$CF$_2$$^c$CF$_2$$^c$CF$_2$$^b$CF$_2$O$^b$CF$_2$$^a$CF$_2$SO$_2$N$_3$;
N$_3$SO$_2$$^a$CF$_2$$^b$CF$_2$O$^d$CF($^e$CF$_3$)$^c$CF$_2$$^b$CF$_2$O$^b$CF$_2$$^a$CF$_2$SO$_2$N$_3$;
$^{19}$F-NMR; (CDCl$_3$; ppm): a: −111 (m) e −114 (m); b: −75 (m); c: −121 (m); d: −139 (m); e: −80 (m).

FT-IR (KBr; cm$^{-1}$): 2283 e 2155 (—N$_3$ st.); 1460 e 1422 (—SO$_2$—N$_3$ st.); 1200-1140 (CF st.).

PREPARATIVE EXAMPLE 5—SYNTHESIS OF
N$_3$CH$_2$CH$_2$(CF$_2$)$_6$CH$_2$CH$_2$N$_3$ [AZIDE AGENT (Cz2)]

A di-iodinated precursor was manufactured by tetrafluoroethylene (C$_2$F$_4$) telomerization with iodine (I$_2$) in the presence of diterbutylperoxide (DTBP), and isolating a I(CF$_2$)$_6$I fraction.

Ethylene addition was then performed with ethylene at a temperature of 180° C. and under a C$_2$H$_4$ pressure of 50 atm, so as to obtain corresponding addition product of formula ICH$_2$CH$_2$(CF$_2$)$_6$CH$_2$CH$_2$I with a selectivity of more than 98.5%. Less than 1.5% moles of the telomer gave rise to the oligomer I(C$_2$H$_4$)$_2$(CF$_2$)$_6$CH$_2$CH$_2$I.

A procedure similar to techniques described in the literature (KARIMI ZARCHI, M. A., et al. A mild and clean synthesis of alkyl azides from alkyl halides mediated by poly(4-vinylpyridine)-supported sodium azide under non-aqueous conditions. *J. Appl. Polym. Sci.* 2011, vol. 121, p. 1916-1920.; ITO, M., et al. A simple and conveniente synthesis of alkyl azides under mild conditions. *Synthesis*. 1995, no. 4, p. 376-378.) was followed for introducing —N$_3$ group; the procedure followed is detailed herein below. In a glass round-bottomed flask, equipped with condenser cooled with water, magnetic stirring, thermometer and dropping funnel, 2.13 g (32.8 mmoles) of NaN$_3$ homogeneously dissolved in 11 ml of distilled water were introduced. Then 310 μl of a phase transfer catalyst commercially available as Aliquat (CH$_3$—N—[(CH$_2$)$_7$CH$_3$]$_3$$^+$Cl$^-$), were also introduced, and immediately separated from the aqueous phase. The reaction mixture was then cooled down under stirring (1000 rpm) at 3° C. with an ice bath, and 5.00 g (8.2 mmoles=16.4 meq) of I—CH$_2$CH$_2$—(CF$_2$)$_6$—CH$_2$CH$_2$—I diluted in 20 ml di CH$_2$Cl$_2$ were added dropwise during about 15 minutes.

After 60 minutes stirring at 3° C., the temperature was let to revert to room temperature (24° C.) during 90 minutes. Mixture was then maintained at 24° C. and 1000 rpm during 15 hours. A colour change was noticed during the course of the reaction; at the end of the addition, the lower organic phase (comprising CH$_2$Cl$_2$) was reddish, because of the presence of —CH$_2$ I moieties, while, as the reaction proceeded, said phase discoloured progressively and became pale yellowish, due to the formation of —CH$_2$N$_3$, which is a colorless chromophore. In parallel, upper aqueous phase progressively was found to change from colorless (NaN$_3$) to yellow/orange (NaI). The lower organic phase was recovered and dried on MgSO$_4$; after filtration, CH$_2$Cl$_2$ was then evaporated. A waxy white solid was thus obtained, containing residual traces of Aliquat. The solid was thus re-dissolved in CH$_2$Cl$_2$ and was eluted on a SiO$_2$ column with 4 volumes of CH$_2$Cl$_2$, while Aliquat remained entrapped in the column.

Conversion=95.2% moles
Yield=95% moles
—N$_3$ functionality=1.905 (the presence of 4.8% moles of end groups of formula —CF$_2$I).
N$_3$$^a$CH$_2$$^b$CH$_2$$^c$CF$_2$$^d$CF$_2$$^e$CF$_2$$^e$CF$_2$$^d$CF$_2$$^c$CF$_2$$^b$CH$_2$$^a$CH$_2$N$_3$
$^{19}$F-NMR; (CDCl$_3$; ppm): c:−115; d: −122; e: −124;
$^1$H-NMR (CDCl$_3$; ppm): a: 2.95; b: 3.4.
FT-IR (KBr; cm$^{-1}$): 2955 (—CH$_2$— st); 2100 (—N$_3$ st.); 1263 (—C—N— st.); 1200-1140 (CF st.).

PREPARATIVE EXAMPLE 6—SYNTHESIS OF
VDF/TrFE OLIGOMER TERMINATED WITH N$_3$
GROUPS [AZIDE AGENT (Cz3)]

A very low molecular weight VDF/TrFE oligomer was manufactured by emulsion polymerization using C$_4$F$_8$I$_2$ as chain transfer agent. Quantitative $^{19}$F-NMR analyses in DMSO d$_6$ gave following characterization for the oligomer: Mw=20659 g/moles; VDF=86% moles; TrFE=13.7% moles; —CF$_2$CH$_2$I=0.2% moles; —CF$_2$CH$_2$OH=0.43% moles. End groups of formula —CF$_2$CH$_2$I, of high stability, were obtained during polymerization by scission of end groups of formula —CH$_2$CF$_2$I, obtained from chain transfer agent, which have very poor stability. These are the groups which were to be reactive sites for nucleophilic substitution with NaN$_3$. End groups of formula —CF$_2$CH$_2$OH were obtained from hydrolysis of end groups of formula —CF$_2$CH$_2$I still occurred during polymerization in aqueous phase in the presence of radical initiator APS.

In a glass round-bottomed flask, equipped with condenser cooled with water, magnetic stirring, thermometer and dropping funnel, 9.24 g (0.894 µmoles, in view of Mw=20659) of the above mentioned oligomer in powder form dissolved in 70 ml of DMSO, were introduced, thus providing a 6.37 mM polymer solution and a 12.8 µM solution of reactive groups of formula —$CF_2CH_2I$.

A large excess of $NaN_3$ (90 mg=1.38 mmol=1543 meq) was then added at 20° C. during 10 minutes and the solution was heated at 45° C. The solution became dark red, because of the formation of NaI within about 2 hours. The reaction was pursued for additional 3 hours, until achieving a total reaction time of 5 hours.

At the end of the reaction, the oligomer comprising azidic group was precipitated by pouring the solution in 500 ml of distilled water. The oligomer was recovered as a fibrous and rubbery solid; it was rinsed on a cellulose filter over a Büchner funnel with about 2 liters of distilled water and then with 2 portions (300 ml each) of $CH_2Cl_2$ so as to extract residual DMSO adsorbed into the oligomer or swelling the same.

The oligomer was finally dried in an oven at 50° C. under reduced pressure (10 mm Hg). Analyses yielded following results:

Mw azidic oligomer=20650 g/mol; Yield=64% wt vs. initial weight of polymer; Acetone solubility: complete at 20° C.; FT-IR (DMSO; $cm^{-1}$):2115 (—$N_3$ st.).

Polymerization Runs—Preparation of VDF-TrFE Polymers

POLYMERIZATION EXAMPLE 7—POLYMERIZATION OF VDF/TrFE IN THE PRESENCE OF MONOMER (Az2) (5% MOLES) [POLYMER (F1)]

In an AISI 316 steel up and over autoclave 46.2 ml of demineralized water were introduced. At room temperature, 3.38 g of sodium based micro emulsion obtained as described in Example 1 of U.S. Pat. No. 7,122,608 (SOLVAY SOLEXIS S. P. A.) Oct. 17, 2006, 0.55 g of monomer (Az2) of formula $CF_2$=$CFCF_2OCF_2CF_2SO_2N_3$ were then added, followed by 2.36 absolute bar of TrFE, 9.07 absolute bar of VDF which were metered from cylinders. Then, using a pump, 270 ml of a solution of ammonium peroxidisulphate (APS) diluted in water with a concentration of 0.1% in weight were fed to start polymerization. Then the temperature was brought to set-point temperature of 70° C., wherein pressure value in the autoclave was found to be 23.1 absolute bars.

Keeping constant the reaction temperature, the pressure was let to fall down to 14.2 abs bar. Then the reactor was cooled at room temperature, the latex was recovered and freezed for 48 hours and once unfreezed the so-coagulated polymer was washed with demineralized water and dried at 80° C. for 48 hours. 6.2 grams of polymer were obtained, whose nominal composition was as follows: VDF: 71.5% moles; TrFE: 23.5% moles; monomer (Az2): 5% moles.

POLYMERIZATION EXAMPLE 8—POLYMERIZATION OF VDF/TrFE IN THE PRESENCE OF MONOMER (Az1) (10% Moles) [POLYMER (F2)]

Same procedure as detailed in Polymerization Example 3 was followed except by using 1.1 g of monomer (Az1) of formula $CF_2$=$CFOCF_2CF_2SO_2N_3$ instead of monomer (Az2). Final pressure was about zero. 9.1 grams of polymer were obtained, whose nominal composition was as follows: VDF: 67.5% moles; TrFE: 21.5% moles; monomer (Az1): 10% moles.

POLYMERIZATION EXAMPLE 9—POLYMERIZATION OF VDF/TrFE IN THE PRESENCE OF MONOMER (Az1) (5% MOLES) [POLYMER (F3)]

Similar procedure as in Polymerization Example 3 was followed, except by using 0.55 g of monomer (Az1) of formula $CF_2$=$CFOCF_2CF_2SO_2N_3$ instead of monomer (Az2), and setting set-point polymerization temperature at 105° C., and continuing polymerization 'till pressure fell to 4.2 abs bar. 9.6 g of polymer were obtained, whose nominal composition was as follows: VDF: 71.5% moles; TrFE: 23.5% moles; monomer (Az1): 5% moles.

POLYMERIZATION EXAMPLE 10—POLYMERIZATION OF VDF/TrFE IN THE PRESENCE OF MONOMER (Az3) (10% MOLES) [POLYMER (F4)]

Same procedure as detailed in Polymerization Example 6 was followed except by using 1.1 g of monomer (Az3) of formula $CH_2$=$CH$—$(CF_2)_6$—$CH_2CH_2N_3$ instead of monomer (Az1) and 2 ml of an organic initiator, namely ditert butyl peroxide (DTBP), instead of the APS aqueous solution. With a set-point temperature of 105° C., final pressure was about 3.4 abs bar. 8.3 grams of polymer were obtained, whose nominal composition was as follows: VDF: 67.5% moles; TrFE: 21.5% moles; monomer (Az3): 10% moles.

Characterization of the Polymers (F-1) to (F-4)

The polymers obtained from Examples 4 to 7 were submitted to DSC analyses according to ASTM D 3418 and to gel permeation chromatography for molecular weight determination. Results are detailed in table herein below.

TABLE 1

| Polymer | $T_g$ (° C.) | $T_{xx}$ (° C.) | $T_{Curie2}$ (° C.) | $T_{m2}$ (° C.) | GPC Mp* |
|---|---|---|---|---|---|
| (F1) - Ex. 7 | −6.0 | 66.2 | 93.5 | 110 | 59000 |
| (F2) - Ex. 8 | −23.3 | 60.6 | 91.8 | 91.8 | 28000 |
| (F3) - Ex. 9 | −24.2 | 70.4 | 108.6 | 108.6 | 34000 |
| (F4) - Ex. 10 | −19.7 | 97.2 | 120 | 129 | 43000 |

*Mp is the sequence molecular weight, as determined by GPC

Manufacture of Films and Crosslinking Thereof Using Polymers (F1), (F2) and (F4) of Examples 7, 8, and 10

A) Spin Coating

Specimens of the polymers (F1), (F2) and (F4) obtained as detailed in Examples 7, 8 and 10, were dissolved in cyclopentanone in admixture with azide agents (Cz1), (Cz2) and (Cz3) so as to provide, after 3 hours stirring at a temperature of 40° C., clear solutions having a concentration of 8% in weight.

Said solutions were loaded into a Laurell WS-650 LITE SERIES spin coater and spin-coated at a speed of 2000 rpm onto glass substrates in order to obtain very thin polymeric layers on glass as substrates. The polymer layers so obtained were dried at 85° C. for 2 minutes. For each example, two polymeric films on glass were prepared.

All the samples obtained by the spin coating process, were all homogeneous, completely transparent and in the thickness range of 150-180 nm, as measured with Filmetrics F20 unit.

Transparency of the films well demonstrate complete miscibility of the azide agents (Cz1), (Cz2) and (Cz3) in the host polymer matrices, which is a particularly advantageous behaviour of the fluorinated crosslinking agents used in the composition of this invention.

B) Crosslinking:

The polymer films obtained as above detailed were submitted to cross-linking procedures, either via thermal treatment or by UV treatment.

Thermal treatment consisted in maintaining samples of films in a ventilated oven at a temperature of about 120 to 135° C.

For UV treatment, samples of films were passed through a semi automatic cross linker device, based on a UV lamp and equipped with a moving belt carrying the samples. Procedure was repeated so as to achieve the below detailed residence time under UV exposure.

In order to verify if the samples were crosslinked, pure acetone was poured on the films after treatment above: insolubility in such conditions was considered to be a clear evidence of suitable crosslinking. Results are summarized in the following tables.

TABLE 2

| Polymer | (F1) From Ex. 7 | | |
|---|---|---|---|
| Curing agent (type) | (Cz1) | (Cz2) | (Cz3) |
| Polymer/curing agent | 90/10 wt/wt | 90/10 wt/wt | 90/10 wt/wt |
| Film thickness (μm) | 173 | 152 | 165 |
| Solubility in acetone before any treatment | soluble | soluble | soluble |
| Thermal treatment: 130° C. for 20 minutes | | | |
| Solubility in acetone | insoluble | insoluble | insoluble |
| UV treatment: 4 seconds | | | |
| Solubility in acetone | insoluble | insoluble | insoluble |

TABLE 3

| Polymer | (F2) From Ex. 8 | | |
|---|---|---|---|
| Curing agent (type) | (Cz1) | (Cz2) | (Cz3) |
| Polymer/curing agent | 90/10 wt/wt | 90/10 wt/wt | 90/10 wt/wt |
| Film thickness (μm) | 175 | 175 | 175 |
| Solubility in acetone before any treatment | soluble | soluble | soluble |
| Thermal treatment: 130° C. for 20 minutes | | | |
| Solubility in acetone | insoluble | insoluble | insoluble |
| UV treatment: 4 seconds | | | |
| Solubility in acetone | insoluble | insoluble | insoluble |

TABLE 4

| Polymer | (F3) From Ex. 10 | | |
|---|---|---|---|
| Curing agent (type) | (Cz1) | (Cz2) | (Cz3) |
| Polymer/curing agent | 90/10 wt/wt | 90/10 wt/wt | 90/10 wt/wt |
| Film thickness (μm) | 175 | 175 | 175 |
| Solubility in acetone before any treatment | soluble | soluble | soluble |
| Thermal treatment: 130° C. for 20 minutes | | | |
| Solubility in acetone | insoluble | insoluble | insoluble |
| UV treatment: 4 seconds | | | |
| Solubility in acetone | insoluble | insoluble | insoluble |

Table herein above well demonstrate that curable composition according to the invention are effectively crosslinked under effect either of thermal treatment or of UV treatment. Furthermore, visual inspection of the cured films showed no inhomogeneity nor white spots or other defects which might be originated by uneven crosslinking behaviour and/or uneven crosslinking density distribution.

The invention claimed is:

1. A crosslinkable composition comprising:
   at least one semi-crystalline fluoropolymer (F) possessing a detectable melting point when submitted to DSC measurements according to ASTM D3418 and comprising recurring units derived from vinylidene fluoride (VDF) and from 10% to 50% by moles with respect to the total moles of recurring units of fluoropolymer (F) of recurring units derived from trifluoroethylene (TrFE); and
   at least one crosslinking agent (Cz) of formula (A):

$$\{N_3[S(O)_{g1}]_{s1}\}_{na}-(R_H)_{nh}-R_f-(R'_H)_{nh'}-\{[S(O)_{g2}]_{s2}N_3\}_{na'} \qquad (A)$$

wherein each of g1 and g2, equal to or different from each other, is 1 or 2, each of s1 and s2, equal to or different from each other, is 0 or 1, each of na and na' is independently zero or an integer of 1 to 3, provided that the sum na+na' is at least 2, each of $R_H$ and $R'_H$, equal to or different from each other, is a $C_1$-$C_{12}$ hydrocarbon group free of fluorine atoms, nh and nh', equal or different from each other are independently 0 or 1, and $R_f$ is selected from the group consisting of i) a $C_3$-$C_{20}$ fluorocarbon group, optionally comprising one or more ethereal oxygen atoms, and ii) an oligomer comprising copolymerized units of vinylidene fluoride and trifluoroethylene.

2. The crosslinkable composition of claim 1, wherein crosslinking agent (Cz) is an agent of formula (B):

$$N_3-(CH_2)_m-R^B_f-(CH_2)_{m'}-N_3 \qquad (B)$$

wherein each of m and m' is independently an integer of 1 to 6, and $R^B_f$ is a $C_3$-$C_{10}$ fluorocarbon group, optionally comprising one or more ethereal oxygen atoms.

3. The crosslinkable composition of claim 2, wherein crosslinking agent (Cz) is an agent of formula (C):

$$N_3-(CH_2)_m-(CF_2)_{nc}-(CH_2)_mN_3 \qquad (C)$$

wherein each of m and m' is independently an integer of 1 to 6, and nc is an integer of 4 to 10.

4. The crosslinkable composition of claim 1, wherein crosslinking agent (Cz) is an agent of formula (D):

$$N_3[S(O)_{g1}]-R^D_f-[S(O)_{g2}]-N_3 \qquad (D)$$

wherein each of g1 and g2, equal to or different from each other, is 1 or 2, and $R^D_f$ is a $C_3$-$C_{20}$ fluoroalkyl group, optionally comprising one or more ethereal oxygen atoms.

5. The crosslinkable composition of claim 4, wherein crosslinking agent (Cz) is an agent of formula (E):

$$N_3-SO_2-R^E_f-SO_2-N_3 \quad (E)$$

wherein $R^E_f$ is a $C_3$-$C_{20}$ fluoroalkyl group, optionally comprising one or more ethereal oxygen atoms.

6. The crosslinkable composition of claim 1, wherein fluoropolymer (F) comprises from 0.01% to 15% by moles with respect to the total moles of recurring units of fluoropolymer (F) of at least one cure-site monomer (CS), wherein monomer (CS) is an ethylenically unsaturated monomer comprising at least one reactive group selected from the group consisting of:
an azide group;
a nitrile group; and
an alkyne group.

7. The crosslinkable composition of claim 6, wherein fluoropolymer (F) comprises from 0.01% to 15% by moles with respect to the total moles of recurring units of fluoropolymer (F) of at least one monomer (Az) comprising an azide group, wherein monomer (Az) is a monomer of formula (I):

$$CX_1X_2=CX-(O)_p-R_f-(CH_2)_n-[S(O)_q]_sN_3 \quad (I)$$

wherein: X, $X_1$ and $X_2$, equal to or different from each other, are independently H or F, p is 0 or 1, n is 0 to 4, s is 0 or 1, q is 1 or 2, $R_f$ is a divalent (hydro)fluorocarbon group, optionally interrupted by one or more ethereal oxygen atoms.

8. The crosslinkable composition of claim 7, wherein monomer (Az) is a monomer of formula (II):

$$CX_1X_2=CX-O-R_f-(CH_2)_n-[S(O)_q]_sN_3 \quad (II)$$

wherein: X, $X_1$ and $X_2$, equal to or different from each other, are independently H or F, n is 0 to 4, s is 0 or 1, q is 1 or 2, $R_f$ is a divalent (hydro)fluorocarbon group, optionally interrupted by one or more ethereal oxygen atoms.

9. The crosslinkable composition of claim 7, wherein monomer (Az) is a monomer of formula (IV):

$$CX''_1X''_2=CX''-R''_f-(CH_2)_{n''}-[S(O)_{q''}]_{s''}N_3 \quad (IV)$$

wherein: X'', $X''_1$ and $X''_2$, equal to or different from each other, are independently H or F, n'' is 0 to 4, s'' is 0 or 1, q'' is 1 or 2, $R''_f$ is a divalent (hydro)fluorocarbon group, optionally interrupted by one or more ethereal oxygen atoms,
wherein the sp$^2$ hybridized carbon atom of the terminal double bond =CX''— is bound to a sp$^3$ carbon atom of the $R''_f$ group.

10. A process for the manufacture of the crosslinkable composition of claim 1, comprising mixing:
at least one semi-crystalline fluoropolymer (F) comprising recurring units derived from vinylidene fluoride (VDF) and from 10% to 50% by moles with respect to the total moles of recurring units of fluoropolymer (F) of recurring units derived from trifluoroethylene (TrFE); and
at least one crosslinking agent (Cz) of formula (A):

$$\{N_3[S(O)_{g1}]_{s1}\}_{na}-(R_H)_{nh}-R_f-(R'_H)_{nh'}-\{[S(O)_{g2}]_{s2}N_3\}_{na'} \quad (A)$$

wherein each of g1 and g2, equal to or different from each other, is 1 or 2, each of s1 and s2, equal to or different from each other, is 0 or 1, each of na and na' is independently zero or an integer of 1 to 3, provided that the sum na+na' is at least 2, each of $R_H$ and $R'_H$, equal to or different from each other, is a $C_1$-$C_{12}$ hydrocarbon group free of fluorine atoms, nh and nh', equal or different from each other are independently 0 or 1, and $R_f$ is selected from the group consisting of i) a $C_3$-$C_{20}$ fluorocarbon group, optionally comprising one or more ethereal oxygen atoms, and ii) an oligomer comprising copolymerized units of vinylidene fluoride and trifluoroethylene.

11. A method of forming a cured shaped part, the method comprising crosslinking the crosslinkable composition of claim 1, such that a cured shaped part is formed.

12. A method for manufacturing an electrical or electronic device, the method comprising processing the crosslinkable composition of claim 1, and crosslinking the processed crosslinkable composition.

13. The process of claim 10, wherein crosslinking agent (Cz) is an agent of formula (B):

$$N_3-(CH_2)_m-R^B_f-(CH_2)_{m'}-N_3 \quad (B)$$

wherein each of m and m' is independently an integer of 1 to 6, and $R^B_f$ is a $C_3$-$C_{10}$ fluorocarbon group, optionally comprising one or more ethereal oxygen atoms.

14. The process of claim 13, wherein crosslinking agent (Cz) is an agent of formula (C):

$$N_3-(CH_2)_m-(CF_2)_{nc}-(CH_2)_{m'}N_3 \quad (C)$$

wherein each of m and m' is independently an integer of 1 to 6, and nc is an integer of 4 to 10.

15. The process of claim 10, wherein crosslinking agent (Cz) is an agent of formula (D):

$$N_3[S(O)_{g1}]-R^D_f-[S(O)_{g2}]-N_3 \quad (D)$$

wherein each of g1 and g2, equal to or different from each other, is 1 or 2, and $R^D_f$ is a $C_3$-$C_{20}$ fluoroalkyl group, optionally comprising one or more ethereal oxygen atoms.

16. The process of claim 15, wherein crosslinking agent (Cz) is an agent of formula (E):

$$N_3-SO_2-R^E_f-SO_2-N_3 \quad (E)$$

wherein $R^E_f$ is a $C_3$-$C_{20}$ fluoroalkyl group, optionally comprising one or more ethereal oxygen atoms.

17. The process of claim 10, wherein fluoropolymer (F) comprises from 0.01% to 15% by moles with respect to the total moles of recurring units of fluoropolymer (F) of at least one cure-site monomer (CS), wherein monomer (CS) is an ethylenically unsaturated monomer comprising at least one reactive group selected from the group consisting of:
an azide group;
a nitrile group; and
an alkyne group.

18. The process of claim 17, wherein fluoropolymer (F) comprises from 0.01% to 15% by moles with respect to the total moles of recurring units of fluoropolymer (F) of at least one monomer (Az) comprising an azide group, wherein monomer (Az) is a monomer of formula (I):

$$CX_1X_2=CX-(O)_p-R_f-(CH_2)_n-[S(O)_q]_sN_3 \quad (I)$$

wherein: X, $X_1$ and $X_2$, equal to or different from each other, are independently H or F, p is 0 or 1, n is 0 to 4, s is 0 or 1, q is 1 or 2, $R_f$ is a divalent (hydro)fluorocarbon group, optionally interrupted by one or more ethereal oxygen atoms.

19. The process of claim 18, wherein monomer (Az) is a monomer of formula (II):

$$CX_1X_2=CX-O-R_f-(CH_2)_n-[S(O)_q]_sN_3 \quad (II)$$

wherein: X, $X_1$ and $X_2$, equal to or different from each other, are independently H or F, n is 0 to 4, s is 0 or 1, q is 1 or 2, $R_f$ is a divalent (hydro)fluorocarbon group, optionally interrupted by one or more ethereal oxygen atoms.

20. The process of claim 18, wherein monomer (Az) is a monomer of formula (IV):

$$CX''_1X''_2=CX''-R''_f-(CH_2)_{n''}-[S(O)_{q''}]_{s''}N_3 \qquad (IV)$$

wherein: X", $X''_1$ and $X''_2$, equal to or different from each other, are independently H or F, n" is 0 to 4, s" is 0 or 1, q" is 1 or 2, $R''_f$ is a divalent (hydro)fluorocarbon group, optionally interrupted by one or more ethereal oxygen atoms, wherein the $sp^2$ hybridized carbon atom of the terminal double bond =CX"— is bound to a $sp^3$ carbon atom of the $R''_f$ group.

* * * * *